UNITED STATES PATENT OFFICE.

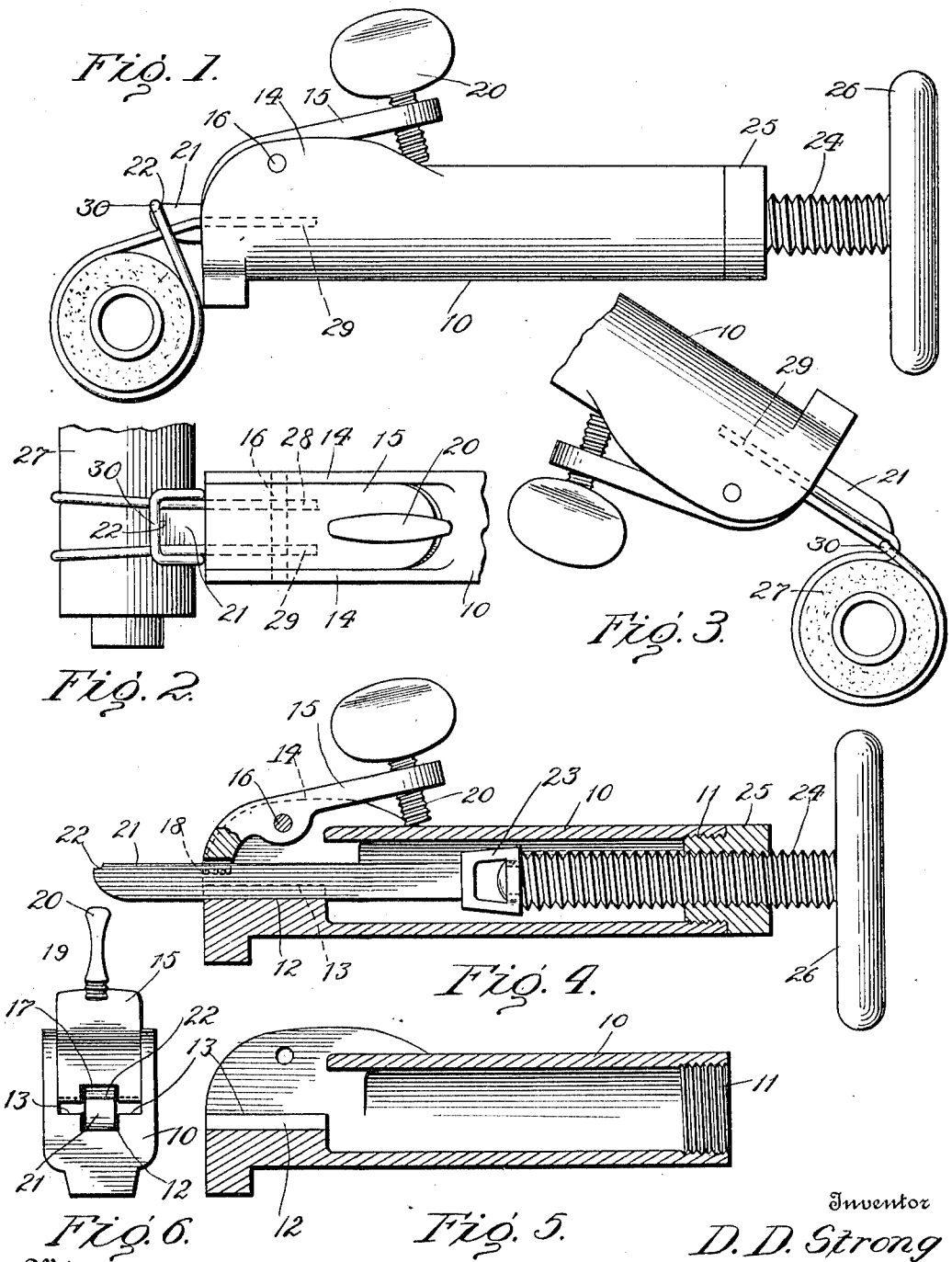

DAN D. STRONG, OF MEMPHIS, TENNESSEE, ASSIGNOR OF ONE-HALF TO MERRELL L. DAVIS, OF MEMPHIS, TENNESSEE.

HOSE-COUPLING IMPLEMENT.

1,001,321.  Specification of Letters Patent.  Patented Aug. 22, 1911.

Application filed November 1, 1910. Serial No. 590,189.

*To all whom it may concern:*

Be it known that I, DAN D. STRONG, citizen of the United States, residing at Memphis, in the county of Shelby and State of Tennessee, have invented certain new and useful Improvements in Hose-Coupling Implements, of which the following is a specification.

This invention relates to improvements in implements for applying hose couplings, and has for one of its objects to improve the construction and increase the efficiency and strength of devices of this character.

Another object of the invention is to provide a device of this character especially designed for applying wire coupling devices and to materially increase the grip of the coupling devices upon the hose.

With these and other objects in view the invention consists in certain novel features of construction as hereinafter shown and described and then specifically pointed out in the claim; and, in the drawings illustrative of the preferred embodiment of the invention, Figure 1 is a side elevation of the improved implement applied, with the parts in their first position; Fig. 2 is a plan view of the same; Fig. 3 is a similar view of the improved implement, showing the positions of the parts after the strain has been applied; Fig. 4 is a longitudinal sectional view; Fig. 5 is a longitudinal sectional view of the body with the parts detached, illustrating the interior construction; Fig. 6 is an end elevation.

Corresponding and like parts are referred to in the following description and indicated in all the views of the drawings by the same reference characters.

The improved device comprises a body 10 internally threaded at one end, as shown at 11, and with an internal guideway 12 near the opposite end and with longitudinal bearing shoulders 13 in the sides of the guideway. The body 10 is likewise provided with upwardly directed sides opposite the guideway 12 and the shoulders 13, as shown at 14 and with an opening between the sides communicating with the guideway.
Fitting between the sides 14 of the body is a clamp lever 15, the clamp lever being pivoted at 16 between the sides. At its shorter end the lever 15 is provided with a recess 17 corresponding in shape to the guideway 12 and with the portions opposite the guideway roughened, as indicated at 18, and designed to operate above the shoulders 13 and clamp the leg portions of the wire clamp upon the shoulders, as hereafter explained. At its longer end the lever 15 is provided with a threaded aperture to receive a pressure imparting screw 20, the inner end of the screw bearing upon the body 10, as shown. By this simple means the grip portions 18 of the lever may be firmly clamped against the wires and hold them upon the shoulders 13.

Slidably disposed in the guideway 12 and likewise extending into the recess 17 of the lever 15 is a piston member 21, the piston member 21 being preferably square, while the guideway 12 and the recess 17 are likewise square, so that the member 21 may be moved longitudinally of the body, and held from rotation. At its outer end the piston member 21 is provided with a notch 22 to receive the "bight" portion of the wire, as hereafter explained. At its inner end the member 21 is connected by a swivel joint 23 to an operating screw 24, the operating screw being threaded into an externally threaded nut 25, the nut being arranged to engage in the threaded portion 11 of the body. The screw 24 is provided with an operating hand wheel 26 at its outer end. By this means it will be obvious that the member 21 may be forcibly actuated by simply rotating the wheel 26. The threads of the screw 24 are preferably coarse, and the screw will be large enough to enable the requisite grip to be applied when the couplings are attached to the hose.

With an implement thus described the operation is as follows: The wire is furnished in the shape shown in Fig. 7 and prior to the application of the implement it is manually or otherwise bent around the hose, indicated at 27 and the terminals 28—29 inserted beneath the "bight" portion 30 of the wire, or in the position shown in Figs. 1 and 2. The terminals 28—29 are then inserted into the space between the shoulders 13 of the body 10 and the grip faces 18 of the lever 15 with the bight portion 30 of the wire engaged by the notch 22 of the member 21. The screw 20 is then operated to firmly clamp the side portions of the wire upon the shoulders 13 and thus firmly couple the same to the body. The screw 24 is then actuated by the hand wheel

26 to force the member 21 through the guideway 12 and thus force the wire around the hose, and embed the same into the soft yieldable hose material. The pressure can be continued as long as required, or until the requisite tension has been secured when the body is rotated around the bight portion 30 as a center, or disposed in the position shown in Fig. 3, which movement bends the terminals of the leg portions of the wire around the bight portion and thus completes the coupling action. It will be obvious that any required pressure may be applied through the action of the powerful screw 24, and all leakage between the hose and the tube upon which it is coupled effectually prevented.

The improved implement may be employed in connection with hose of various sizes and to hose employed for various purposes, but the improved implement is designed more particularly for uniting the hose to pipes in air brake apparatus, and where an abnormal resistance is required.

The improved implement is simple in construction, can be inexpensively manufactured, is strong and durable, and enables the operator to apply a very strong grip upon the coupling devices.

The implement may be manufactured in different sizes.

Having thus described my invention, what is claimed as new is:

An implement of the class described comprising a tubular stock, having longitudinal guideways at one end and internally threaded at the other end, a threaded bushing engaging in the threaded terminal of the stock, a clamping device carried by said stock, a piston member operating in said guideway, said clamping device being adapted to engage the terminals and said piston adapted to engage the bight portion of a U shaped wire, a screw engaging through said bushing, and a swivel device connecting said screw to said piston whereby said clamping device and piston co-act to cause the wire to be bent around a hose.

In testimony whereof, I affix my signature in presence of two witnesses.

DAN D. STRONG. [L. S.]

Witnesses:
J. E. O'ROURKE,
W. M. BATES.

Copies of this patent may be obtained for five cents each, by addressing the "Commissioner of Patents, Washington, D. C."